Feb. 13, 1951         J. PESENTI         2,541,094
COMBINED FRYING PAN COVER AND COLANDER
Filed July 17, 1948
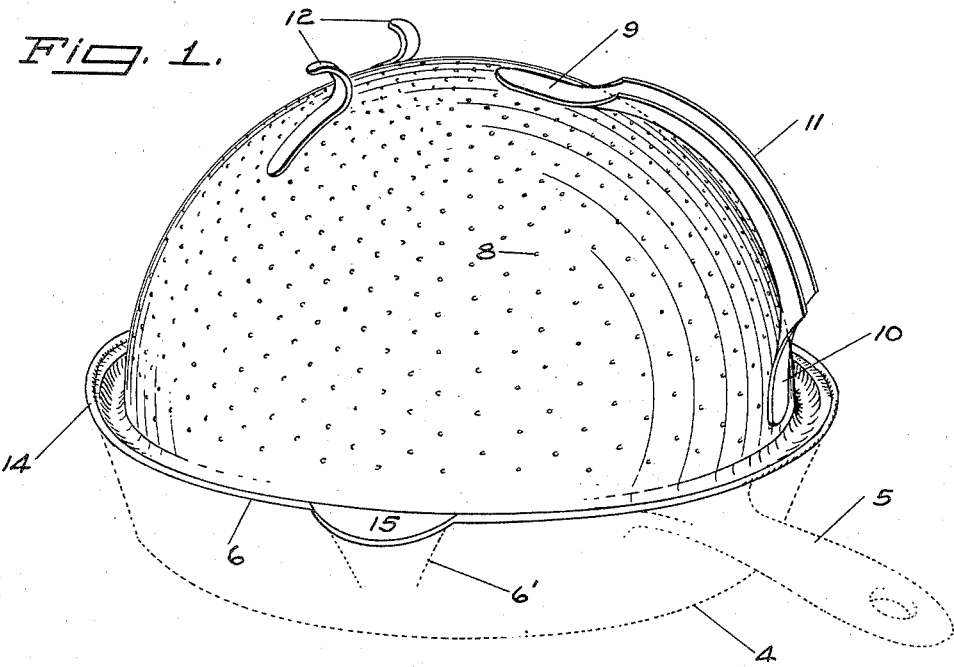
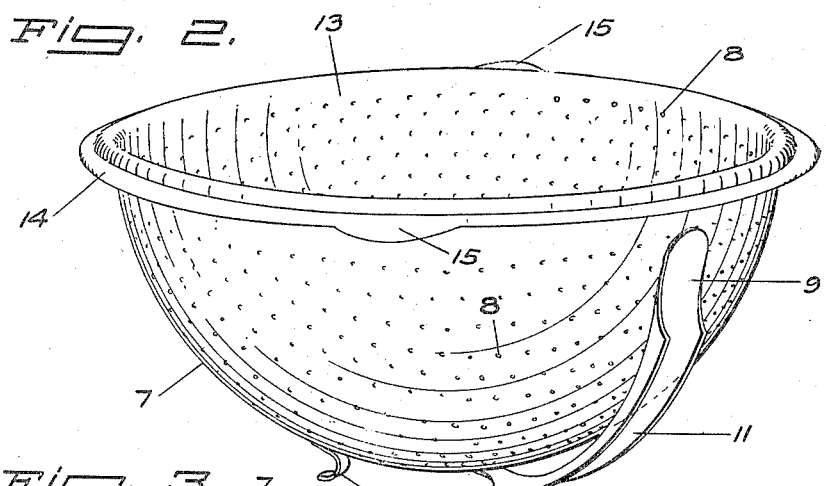
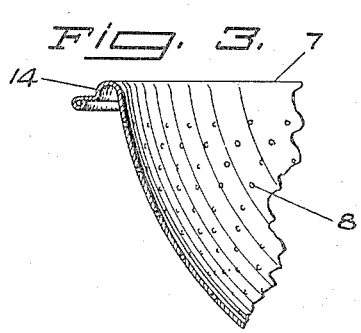
INVENTOR.
JOE PESENTI
BY Edward C. Healy
ATTORNEY

UNITED STATES PATENT OFFICE 2,541,094

COMBINED FRYING PAN COVER AND COLANDER

Joe Pesenti, San Francisco, Calif.

Application July 17, 1948, Serial No. 39,332

1 Claim. (Cl. 260—149)

This invention relates to improvements in kitchen utensils and has particular reference to a combined frying pan cover and colander.

The principal object of the invention is the production of a utensil of the character described that has a dual field of use as a covering for a frying pan to prevent splashing and spattering of grease when food products are being fried and likewise, when it is reversed, serves as a colander for straining water and other liquids from vegetables and the like.

A further object of the invention is the provision of means in the structure, in the form of lateral extensions or lips that function to cover the pouring spout of a pan, when the article is used as a pan cover, and serve as media for lifting the colander when it is desired to effect a rapid pouring of the liquid from the colander or to empty the cooked products from the colander.

An additional object of the invention is the formation of a bead arrangement that will effectively cover and rest on the top rim of the pan, to prevent the spattering of grease during a cooking operation.

A further object of the invention is the production of an article of the character described that is simple in construction, economical to manufacture, light in weight, positive in action, and highly efficient in use.

Other objects and advantages will be apparent during the course of the following description.

In the accompanying drawing wherein for the purpose of illustration is shown the preferred embodiment of my invention, Fig. 1 is a positive view of the utensil when it serves as a covering for a frying pan, Fig. 2 is a similar view of the utensil disclosing the use of the same as a colander, and Fig. 3 is a fragmentary view of the utensil disclosing to advantage the rim structure of this particular article of manufacture, a portion of the rim and body being shown in section.

Referring to the drawing the numeral 4 indicates a frying pan that is equipped with a handle 5 and annular rim 6 and a pouring spout 6'. The device is preferably made of aluminium and embodies in its construction a dome-shaped body portion 7. A plurality of minute openings 8 are provided in said body and serve, when the article is used as a colander, to permit the seepage of water therethrough. Since the openings are exceedingly small in form there is no danger of the splattering grease passing through the same when the article is used as a frying pan cover, as illustrated in Fig. 1.

A handle, that functions as the medium for lifting the utensil, is suitably secured to one side of the body as at 9 and 10 and said body embodies in its construction an arcuate body 11, one end thereof adjacent the point of connection 9, serving as a rest. The said rest cooperates with a pair of curved feet 12 to thus provide a substantially triangular support to prevent a tilting of the utensil when it is positioned on any supporting base.

It will be noted that said utensil is open-ended as at 13 and is equipped with an annular curved bead or flange 14. The position that the bead assumes when placed on the rim 6 of the frying pan is disclosed to advantage in Fig. 1 of the drawing.

A pair of diametrically disposed lips 15 are integrally formed with the flange 14, one of the lips functioning to cover the pouring spout of the frying pan to thus eliminate the danger of grease passing through the spout when food products are being fried. Said lips also serve as finger holds for lifting the colander.

The article of the present invention can be made in various sizes to conform to the dimensions of the pan that is used.

From the foregoing description considered in connection with the accompanying drawing it will be obvious that I have devised a most distinctive and highly serviceable article of manufacture, whereby the various objects of the invention can be readily accomplished.

It is to be understood that the form of my invention herewith shown and described is to be taken as a preferred example of the same and that various changes relative to the shape, size, material and arrangement of parts may be resorted to without departing from the spirit of the invention or the scope of the subjoined claim.

Having thus described my invention, I claim:

A device of the character described comprising a shallow perforated body equipped with a flange and an enlarged open end, an annular bead provided on said flange, a pair of diametrically opposed lips carried by said bead and positioned at right angles thereto, and means provided on the bottom of said body for supporting the same, said means comprising an arcuate handle secured to one side of said body and a pair of spaced legs secured to the opposite side of said body, the handle and legs defining a triangular support to retain said device in an upright position.

JOE PESENTI.

(References on following page)

REFERENCES CITED

The following references are of record in the file of this patent:

UNITED STATES PATENTS

| Number | Name | Date |
|---|---|---|
| D. 31,464 | Himoult | Aug. 29, 1899 |
| 1,105,409 | De Creveroeur | July 28, 1914 |
| 1,507,522 | Simon | Sept. 2, 1924 |
| 1,554,360 | Massing | Sept. 22, 1925 |

OTHER REFERENCES

Webster's New International Dictionary of the English Language, 2d edition, published by G. and C. Merriam Co., Springfield, Mass.